United States Patent [19]
Stafford

[11] Patent Number: 5,825,302
[45] Date of Patent: Oct. 20, 1998

[54] SYSTEM AND METHOD FOR TRANSMITTING DATA USING REFLECTED ELECTROMAGNETIC RADIATION

[75] Inventor: Ronald E. Stafford, Wylie, Tex.

[73] Assignee: Texas Instruments Incorporated, Dallas, Tex.

[21] Appl. No.: 752,117

[22] Filed: Nov. 20, 1996

[51] Int. Cl.$^6$ .................................................. G08C 19/16
[52] U.S. Cl. ........................ 340/870.01; 340/870.11; 340/825.54; 340/870.03; 340/870.02; 340/870.31; 455/500; 455/507
[58] Field of Search ................... 340/870.02, 870.05, 340/870.06, 870.3, 870.32, 870.03, 870.31, 870.01, 825.54, 870.11; 343/832; 455/39, 66, 500, 507

[56] References Cited

U.S. PATENT DOCUMENTS

| | | | |
|---|---|---|---|
| 3,859,624 | 1/1975 | Kriofsky et al. | 340/38 |
| 4,114,151 | 9/1978 | Denne et al. | 343/6.8 |
| 4,390,880 | 6/1983 | Henoch | 343/6.8 |
| 4,463,354 | 7/1984 | Sears | 340/870.05 |
| 4,652,877 | 3/1987 | Gray | 340/870.31 |
| 4,746,830 | 5/1988 | Holland | 310/313 |
| 4,758,836 | 7/1988 | Scuilli | 340/870.31 |
| 4,912,471 | 3/1990 | Tyburski et al. | 342/42 |
| 4,941,201 | 7/1990 | Davis | 340/870.31 |
| 5,053,774 | 10/1991 | Schuermann et al. | 342/44 |
| 5,247,304 | 9/1993 | D'Hont | 342/44 |
| 5,278,551 | 1/1994 | Wakatsuki et al. | 340/870.02 |
| 5,302,954 | 4/1994 | Brooks et al. | 342/44 |
| 5,410,738 | 4/1995 | Diepstraten et al. | 455/66 |
| 5,450,492 | 9/1995 | Hook et al. | 380/28 |
| 5,493,287 | 2/1996 | Bane | 340/870.02 |
| 5,519,381 | 5/1996 | Marsh et al. | 340/825.54 |

OTHER PUBLICATIONS

"Short–Range Radio–Telemetry for Electronic Identification, Using Modulated RF Backscatter", by Alfred R. Koelle, Steven W. Depp, and Robert W. Freyman, *Proceedings of the IEEE*, Aug. 1975.

Primary Examiner—Michael Horabik
Assistant Examiner—Timothy Edwards, Jr.
Attorney, Agent, or Firm—James C. Kesterson; Richard L. Donaldson

[57] ABSTRACT

A system for transmitting data, comprising an interrogator (14) for transmitting an interrogation signal, a plurality of data collectors (12) for collecting data, a plurality of transponders (11) each coupled to a corresponding data collector (12) and each operable to receive the interrogation signal and to use the energy of the interrogation signal to transmit a response signal containing data from the data collector (12) associated with the transponder and wherein the interrogator (14) is further operable to receive the response signal from the transponders (11).

8 Claims, 3 Drawing Sheets

SYSTEM AND METHOD FOR TRANSMITTING DATA USING REFLECTED ELECTROMAGNETIC RADIATION

TECHNICAL FIELD OF THE INVENTION

The present invention relates in general to the field of data transmission, and more particularly to a system and method for transmitting data that uses reflected electromagnetic radiation.

BACKGROUND OF THE INVENTION

In order to implement a system for transmitting data between two physically separated locations, it is often necessary that each location have equipment for receiving and transmitting the data. The power requirements for most equipment used to receive and transmit data may be significant. In addition, the relative complexity of this equipment may increase the hardware cost of the data transmission system.

For example, a telephone system utilizes a transmitter and receiver unit at each user location. These units require relatively significant amounts of power and use this power to transmit data from a transmitter over conductors or through space to the receiver.

Similarly, digital computer systems also use transmitter/receivers to transmit data between two physically separated locations, where each digital computer or peripheral digital device may require a power source for maintaining a high voltage signal on a data line. Data is transmitted digitally between devices by modulating the high voltage from "on" to "off". Although some peripheral devices exist that draw all power requirements from the digital computer, this configuration necessarily requires that conductors for power transmission be installed between the digital computer and the peripheral device. In addition, practically every peripheral device requires electrical conductors between the peripheral and the digital computer in order to transmit data to and receive data between the devices in the digital computer system.

For many applications, the power requirements for data transmission systems may be significant. This constraint often requires that transmission devices remain "tied" to large stable power sources. This in turn prohibits such devices from becoming mobile, or when adapted for mobile use, require large battery power sources that make using the device less desirable. For example, the battery in a cellular telephone is typically only available for a limited time of continuous data transmission before it is depleted and needs to be recharged or replaced. Cordless telephones also require continuous recharging and cannot transmit data for more than a limited time before the battery is depleted and must be recharged or replaced.

Many existing data transmission applications, such as a cordless telephone or computer systems, include a central unit having a power source, and a remote unit or units that have limited power storage and generation capability. Many of these applications do not utilize "wireless" or "cordless" data transmission, even though it would be desirable for them not to be connected to the central unit by a conductor. Despite this long-felt need, there is no existing technology that can provide such applications with "cordless" data transmission without requiring relatively large amounts of power and the associated battery charging and replacement requirements of existing data transmission systems.

SUMMARY OF THE INVENTION

Therefore, a need has arisen for a data transmission system that does not require a large power source at a remote unit to transmit data from the unit.

A further need exists for a system for data transmission that can operate from a remote location for a period of months or years on conventional batteries, solar cells, or other low power sources.

In accordance with the teachings of the present invention, a system and method for transmitting data using reflected electromagnetic radiation is provided that substantially eliminates or reduces disadvantages and problems associated with state of the art data transmission systems.

One aspect of the present invention provides a system for transmitting data. The system includes interrogator for transmitting an interrogation signal, a plurality of data collectors for collecting data, and a plurality of transponders each coupled to a corresponding data collector. Each transponder receives the interrogation signal and uses the energy of the interrogation signal to transmit a response signal containing data from the data collector. The interrogator receives the response signal from the transponders.

Another aspect of the present invention provides a system for transmitting data. The system includes an interrogator for transmitting an interrogation signal, a plurality of data collectors for collecting data, and a plurality of transponders each coupled to a corresponding data collector. Each transponder receives the interrogation signal and uses the energy of the interrogation signal to transmit a response signal containing data from the data collector. The system further includes a first data storage coupled to each data collector for storing data collected by the data collector, a second data storage coupled to the interrogator for storing data received by the interrogator, a first processor coupled to each transponder for controlling the transmission of data from the transponder, and a second processor coupled to the interrogator for controlling the transmission of data from the interrogator. The interrogator can also receive the response signals from the transponders.

Yet another aspect of the present invention provides a method for transmitting data. The method includes collecting data at a plurality of data collectors. The method further includes transmitting an interrogation signal from an interrogator and receiving the interrogation signal at a plurality of transponders each coupled to a corresponding data collector. The method also includes using the energy of the interrogation signal to transmit a response signal containing data from the data collector associated with the transponder and receiving the response signal from the transponder at the interrogator.

A technical advantage of the present invention is the ability to transmit data from a transponder to an interrogator that does not require the transponder to generate electromagnetic radiation, thus reducing the power requirements for the transponder.

A further technical advantage of the present invention is the ability to communicate with a plurality of transponders from a single interrogator, thus eliminating the need for multiple transmitters and the potential for complications, such as crosstalk.

Another technical advantage of the present invention is that by reducing the power requirements for the transponder to transmit data, the power storage or battery requirements of the transponder may be minimized. This advantage also increases the life of the power source of the transponder.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

The preferred embodiments of the present invention are illustrated in the FIGURES, like numerals being used to refer to like and corresponding parts of the various drawings.

Figure 1:
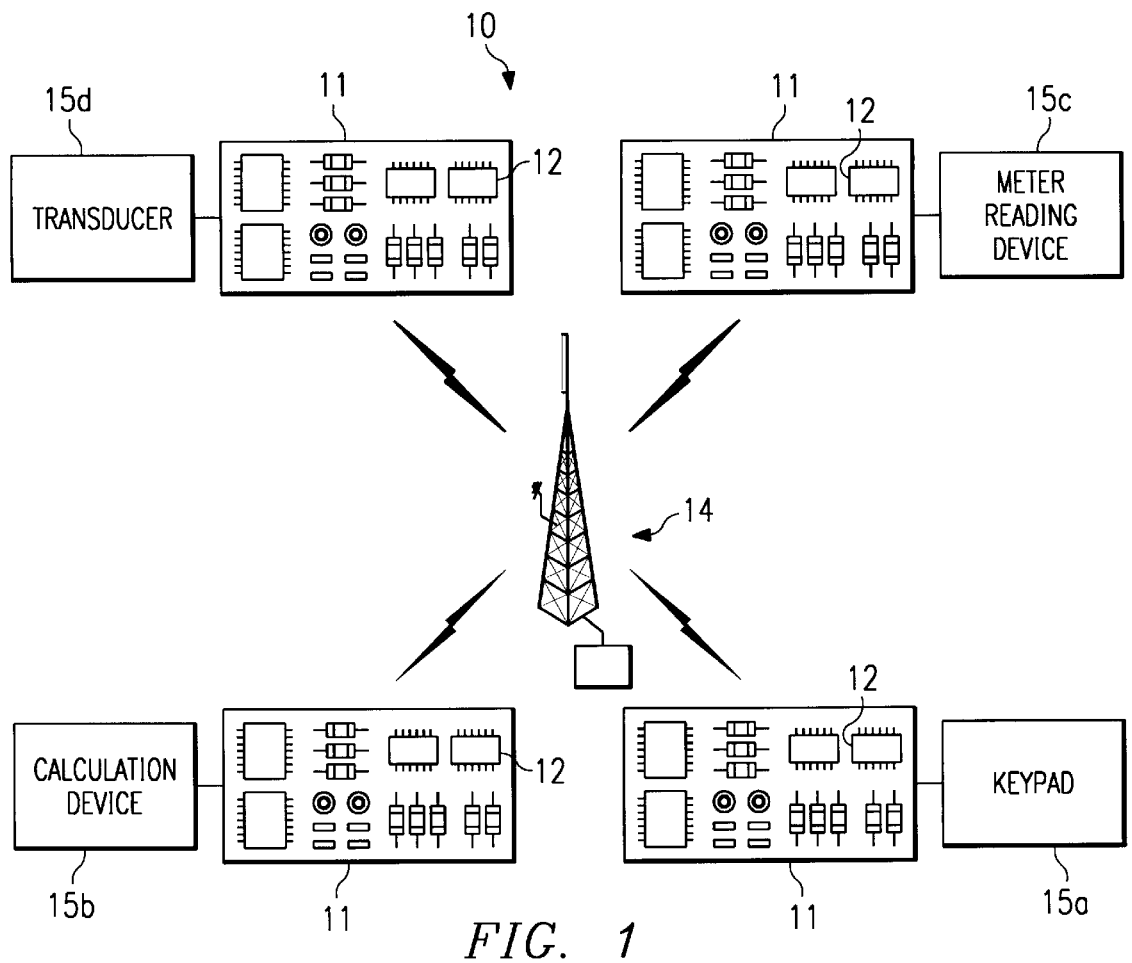
FIG. 1 illustrates a block diagram of the data transmission system of the present invention.

FIG. 1 illustrates a block diagram of data transmission system 10 embodying concepts of the present invention. System 10 includes multiple transponders 11, data collection storage means 12, and interrogator 14. Interrogator 14 may operate in two modes; data transmission mode and carrier signal mode. In the data transmission mode, interrogator 14 transmits data using radiated electromagnetic radiation. The data may be transmitted at any desired frequency. In the carrier signal mode, interrogator 14 transmits a stream of pulses, and receives reflected electromagnetic radiation from transponders 11. Alternately, interrogator 14 may operate simultaneously in the data transmission and carrier signal mode by transmitting data at one frequency and by transmitting the carrier signal at a second frequency.

Transponders 11 are arrayed about interrogator 14. Each transponder 11 is coupled to a data input means 13, which may be, for example, a keypad 15a, a calculation device 15b, a meter reading device 15c, a transducer 15d, or any other device that collects or generates data. Each transponder 11 may operate in two modes; data reception mode and data transmission mode. In the data reception mode, each transponder 11 receives data transmitted by interrogator 14. Each transponder 11 operates in the data reception mode when interrogator 14 is operating in its data transmission mode. When transponder 11 is in the data transmission mode, it reflects the electromagnetic radiation emitted by interrogator 14 to transmit a response signal to interrogator 14. Typically, one transponder 11 will be in the data transmission mode at any given time. Interrogator 14 selectively transmits to transponders 11 through the use of an appropriate signaling protocol, such as, for example, time division multiple access (TDMA). Each transponder 11 has a specific address that may be included in the transmission sent to transponder 11 by interrogator 14. Transponder 11 switches from data reception mode to data transmission mode upon receiving a unique command from interrogator 14 that indicates the particular transponder 11 that is being addressed. Transponder 11 may also operate simultaneously in the data reception and data transmission mode, as long as the data reception mode and data transmission mode operate at different frequencies.

Example embodiments for the structure and operation of transponder 11 and interrogator 14, operating in a half duplex arrangement may be found in U.S. Pat. No. 5,053,774 issued to Schuermann, et. al., entitled *Transponder Arrangement*, assigned to Texas Instruments, Incorporated, filed Feb. 13, 1991, application Ser. No. 7/655,182, issued Oct. 1, 1991, and which is expressly incorporated by reference for all purposes herein.

Figure 2:
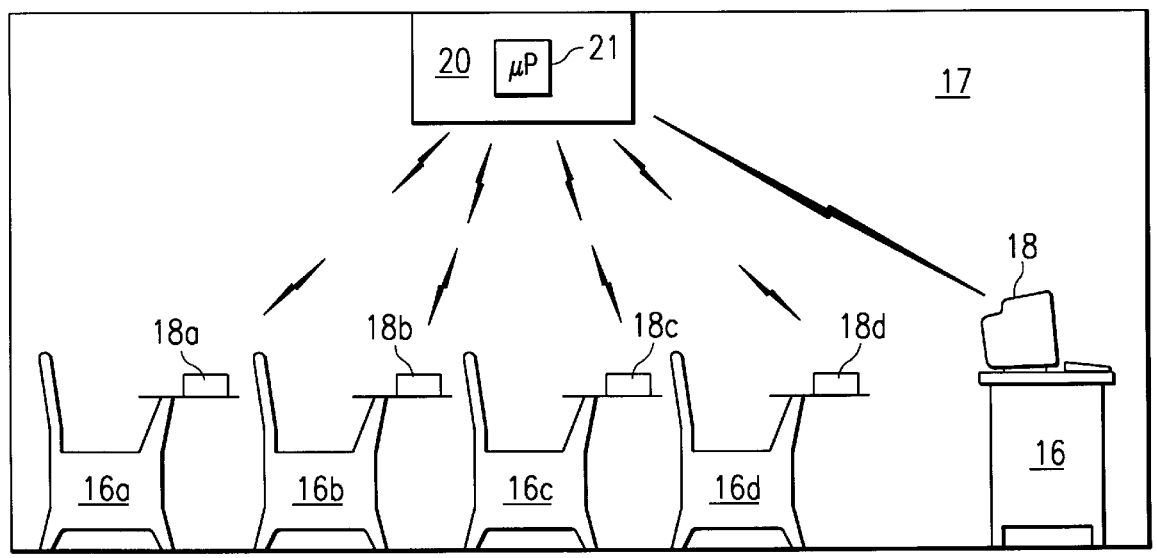
FIG. 2 shows a generally schematic view of a classroom application of the present invention.

FIG. 2 illustrates a classroom application of the present invention. A plurality of individual workstations 16a, 16b, 16c and 16d are distributed throughout classroom 17. Each individual workstation 16a–16d contains transponder 11 (not shown), and data collectors, such as 15a or 15b (also not shown) similar to those shown and described in discussions relating to FIG. 1. The transponder 11 and data collectors 12 are collectively represented in FIG. 2 by devices 18a, 18b, 18c and 18d. Master workstation 16 is also provided in classroom 17 and is accessible by the instructor. Master workstation 16 also contains a transponder 11 and a data collector 12, and may further include a processor, and a display unit. The transponder 11, data collector 12, a processor (not shown) and the display unit are collectively represented by device 18. Interrogator unit 20 is similar to interrogator 14, but further includes processor 21 and is installed at a central location in classroom 17. Processor 21 may be embodied in a microprocessor, a general purpose processor, and many other analog or digital information processing devices. Interrogator unit 20 is programmed to receive data transmission instructions from master workstation 18.

The instructor at device 18 located on top of master workstation 16 may cause interrogator unit 20 to communicate with individual workstations 16a–16d either as a group or individually. Because the devices 18a–18d at individual workstations 16 and device 18 at master workstation 18 do not require conventional transmitters to generate a response signal, the power requirements for workstations 16, and 16a–16d are lower than would be required for similar workstations equipped with conventional transmitters. This allows the devices at individual workstations 16a–16d and master workstation 16 to function for extended periods of time on conventional battery power sources without the need for battery recharging or replacement.

In this embodiment of the invention, the device 18 at master workstation 16 is used in classroom 17 to transmit mathematical algorithms or other data to interrogator unit 20. Interrogator unit 20 then transmits the data to the devices 18a–18d at individual workstations 16a–16d, either individually by using TDMA or as a group depending upon instructions received from the device 18 at master workstation 16. Upon receiving a given signal from the device 18 at master workstation 16 or upon demand from the users of individual workstations 16, a response, solution, or similar data may be transmitted from the devices 18a–18d located at individual workstations 16a–16d to interrogator unit 20, which then retransmits the received data to the device 18 at master workstation 18. This data transmission may be accomplished using the interrogation and response signal generation described in discussions above relating to FIG. 1.

In this embodiment, various advantages of the present invention can be appreciated. The devices 18 and 18a–18d at master workstation 16 and individual workstations 16 respectively may be small hand-held calculation devices, powered by conventional batteries. Only interrogator unit 20 requires relatively large amounts of power for transmitting an interrogation signal to transponders 11 associated with the calculation device. Thus, master workstation 18 and individual workstations 16 may be powered for months or years without recharging or replacing the batteries, or without requiring an external source of power. Likewise, the device 18 at master workstation 16 may be connected to a personal computer, that may be programmed to transmit questions to and receive answers from individual workstations 16. Thus, in-class testing may be conducted with the present invention and automatically graded as the answers are submitted.

In this embodiment of the present invention in FIG. 2, individual devices 18a–18d 16 may be portable, and could be carried from class to class by each student for use in testing or other administrative matters, such as attendance. Such applications are not permitted with existing technology, because the power requirements of individual transmitters require frequent recharging or replacement of batteries. In addition, coordination of data transmission between individual transmitters may be difficult and trouble-prone, since each unit may conceivably transmit simultaneously at the same frequency, resulting in such problems as cross talk or failure of data transmission.

Figure 3:
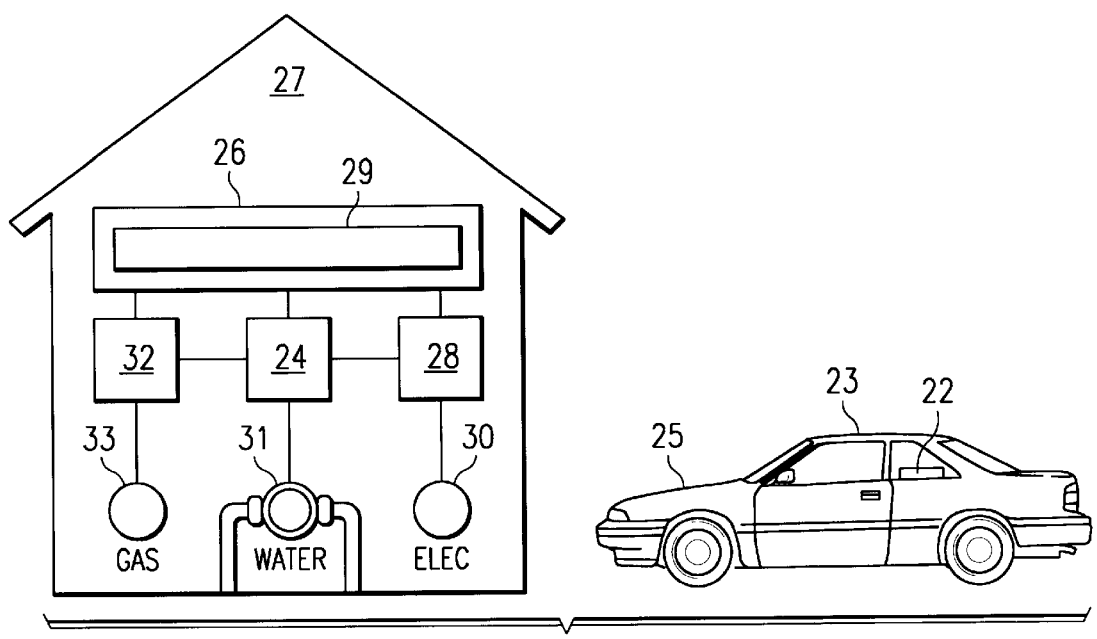
FIG. 3 provides a generally schematic view of a meter reading application of the present invention.

FIG. 3 illustrates a meter reading application of the present invention including central station 22 and remote unit 26. Central station 22 contains an interrogator (not shown), data storage (not shown), and processor (not shown) installed in vehicle 25. The processor may be similar to processor 21 in FIG. 2. Remote unit 26 is installed within dwelling 27 and contains a transponder (not shown), multiple data interfaces 24, 28 and 32, and data storage 29. Remote unit 26 is connected via data interfaces 28, 24 and 32 to meter reading devices at electric power meter 30, water meter 31, and gas meter 33 respectively.

As central station 22 moves past dwelling 27 containing remote unit 26, it transmits a request to remote unit 26 to retrieve data from the meter reading devices at electric power meter 30, water meter 31, and gas meter 32. Remote unit 26 retrieves the data from the meter reading devices and stores the data in data storage 29. Central station 22 transmits an interrogation signal to transponder 11 in remote unit 26 in dwelling 27. In response to the interrogation signal, transponder 11 transmits a response signal containing the data stored in data storage 29 to central station 22.

Power for the data collection functions performed by remote unit 26 may be supplied by a solar cell or an inductive system (not shown) that draws power inductively from the electric power service feeder to dwelling 27, thus eliminating the need for even infrequent replacement of a battery. Those skilled in the art will appreciate that this embodiment of the invention eliminates the need for high power transmitters at remote unit 26, and also eliminates the potential for multiple transmissions of electromagnetic radiation from other transmitters to interfere with the desired signal. It is also noted that the embodiment shown in FIG. 3 is not limited to the metering equipment shown and described. Any data collected in dwelling 27 may be transmitted by remote unit 26 to central station 22.

Figure 4:
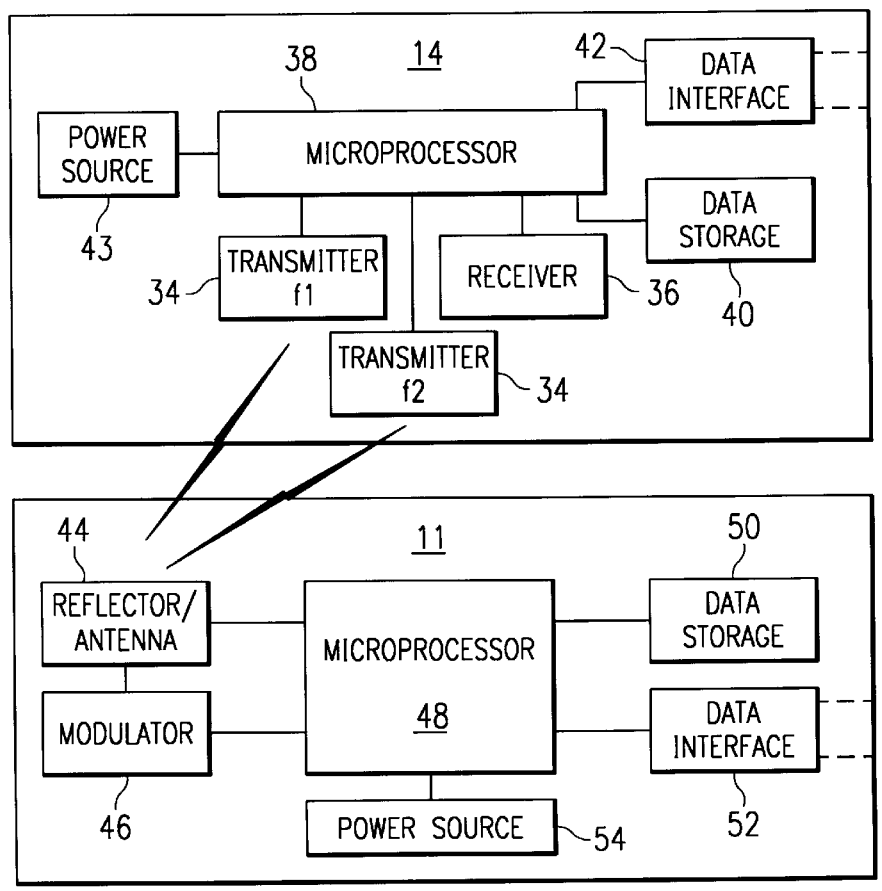
FIG. 4 illustrates a block diagram of the interrogator and transponder unit of the present invention.

FIG. 4 illustrates block diagrams for a reflective antenna type transponder 11 and interrogator 14. Interrogator 14 may contain transmitter 34 and receiver 36. Those skilled in the art will appreciate that transmitter 34 and receiver 36 may be integrated into the same device without altering the functionality of the present invention. In addition, interrogator 14 may also contain processor 38 coupled to transmitter 34 and receiver 36, data storage 40 coupled to processor 38, data interface 42 coupled to processor 38, power source 43 coupled to processor 38. Processor 38 may have one of several embodiments, including but not limited to a microprocessor, a general purpose processor, a reduced instruction set computing (RISC) device, or many other analog or digital information processing devices. Data interface 42 may be embodied in many forms, including, but not limited to, a parallel port, a serial port, or an analog to digital converter.

As previously described, interrogator 14 may operate in two modes. In the first mode, the data transmission mode, transmitter 34 emits a signal that contains encoded information. The encoded data may be provided directly by data storage 40 or data interface 42 to transmitter 34. Alternately, the encoded data may be transmitted through processor 38 to transmitter 34 for transmission. In the second mode, carrier signal mode, transmitter 34 emits a constant stream of digital pulses that are received by transponder 11. Receiver 36 in interrogator 14 receives a reflected electromagnetic signal from transponder 11. The reflected electromagnetic signal may either be provided directly to data interface 42 or to data storage 40 or as shown through processor 38.

In addition, interrogator 14 may simultaneously operate in the data transmission mode and the carrier signal mode. This configuration may require at least two transmitters 34, each transmitting at a different frequency.

Transmitter 34 is operable to radiate electromagnetic radiation into a conducting medium, such as free space, a metal conductor, a waveguide, or a fiber optic conductor. The radiated energy reaches transponder 11, where it illuminates reflector/antenna 44 that is connected with the conducting medium. Reflector/antenna 44 may be an optical reflector, such as a spatial light modulator (Digital Mirror Device) (not explicitly shown). Reflector/antenna 44 may also be a microwave reflector, such as a dipole antenna in parallel with a diode (not shown). In this configuration, the microwave antenna will become a reflector when the diode is biased in a blocking state. Other configurations are possible, depending upon the wavelength of the electromagnetic radiation that is being utilized to transmit the data.

Transponder 11 comprises reflector/antenna 44, which is coupled to modulator 46. Both modulator 46 and reflector/antenna 44 are coupled to processor 48. Processor 48 may be similar to processor 38 in interrogator 14. Processor 48 is also coupled to data storage 50, data interface 52, and power source 54. Modulator 46 and reflector/antenna 44 may also be coupled directly to data storage 50 and data interface 52 (not shown).

Data interface 52 may be any device used to receive data from an external device and transmit data to processor 48, such as a commercially available serial or parallel processor port for applications that generate encoded data, or a commercially available analog to digital converter. Processor 48 is also coupled to power source 54, that may be a battery, a solar cell, or any other appropriate power source. Those skilled in the art will appreciate that power source 54 could also be a device that absorbs and stores electromagnetic energy transmitted by interrogator 14.

As previously noted, transponder 11 may operate in two modes. In the first mode, data reception mode, reflector/antenna 44 is coupled to and controlled by modulator 46 to receive an interrogation signal from interrogator 14. If data is encoded in the interrogation signal, reflector/antenna 44 may either transmit the data directly to data storage 50 through processor 48 or to data interface 52 through processor 48. Processor 48 is operable to monitor the data to determine the correct destination for the data and to further determine when data transmission is completed. When the appropriate data signal is sent from interrogator 14, transponder 11 will switch from the data reception mode to the data transmission mode.

When transponder 11 is operating in the second mode, the data transmission mode, reflector/antenna 44 is controlled by modulator 46 to alternately absorb or reflect the radiated energy. Modulator 46 receives data, either from data storage 50 or data interface 52, directly or through processor 48, and causes reflector/antenna 44 to reflect or absorb the carrier pulses emitted by interrogator 14. Thus, data from data storage 50 or data interface 52 may be encoded in the reflected electromagnetic radiation as a response signal. As previously noted, receiver 36 is operable to receive this reflected electromagnetic radiation. When the data transmission is completed, modulator 46 causes reflector/antenna 44 to emit a data signal that indicates to interrogator 14 that data transmission has been completed. Transponder 11 then automatically switches back to the data reception mode.

Transponder 11 may also operate simultaneously in the data reception mode and the data transmission mode, with the addition of a second reflector/antenna 44 that operates at a second frequency. In order for transponder 11 to operate simultaneously in both modes, interrogator 14 must also be designed to operate simultaneously in both modes.

Figure 5:
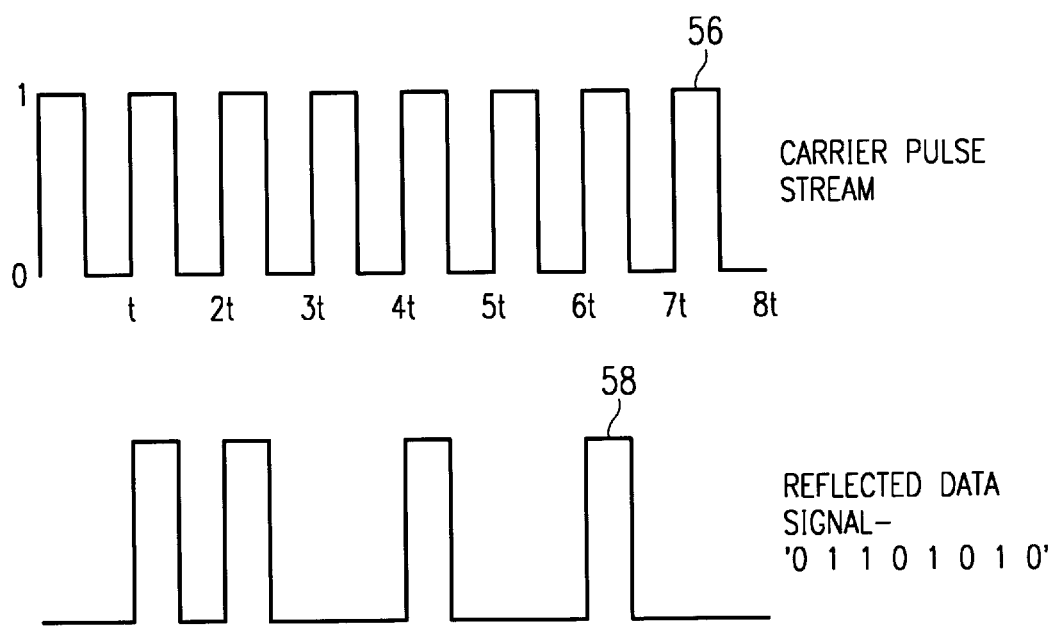
FIG. 5 illustrates an exemplary timing diagram for the carrier signal and reflected data signal of the present invention.

FIG. 5 illustrates an exemplary timing diagram of a data communication technique that may be used for transmitting data from transponder 11 to interrogator 14. In the carrier signal mode, interrogator 14 generates a stream of positive pulses 56, where each positive pulse lasts for one half of the duration of period t. Those skilled in the art will appreciate that positive pulses 56 may be comprised of a number of pulses at a higher frequency than 1/t, or of a single half wave of a pulse with a frequency equal to 1/t. Prior to switching into the carrier signal mode, interrogator 14 transmits a signal to transponder 11 causing transponder 11 to switch from data reception mode to the data transmission mode. Modulator 46 of transponder 11 then causes reflector/antenna 44 to selectively reflect and absorb the electromagnetic energy of the carrier signal pulses, such that the data stored in data storage 50, data interface 52, or other data, is encoded in reflected electromagnetic energy 58. After completing data transmission, transponder 11 encodes a message that data transmission has been completed and automatically switches to data reception mode.

In operation, interrogator 14 will broadcast a request for information from one of the plurality of transponders 11. This request may include transponder-specific address information. All transponders 11 are initially in the data receiving mode and are screening interrogator 14 signal for the request for information message that includes their specific address. Upon receiving this message, transponder 11 with the correct address will switch to data transmission mode and will begin transmitting data to interrogator 14. Prior to transmitting, transponder 11 will wait for interrogator 14 to enter the carrier signal mode.

After interrogator 14 enters the carrier signal mode, transponder 11 will begin transmitting data. An appropriate handshaking or error-correction protocol may be included prior to data transmission to verify that the correct transponder 11 is responding and that there are no other data transmission problems. Transmission of data by modulation of reflector/antenna 44 of transponder 11 then continues until data transmission is completed. Upon completion of data transmission, transponder 11 sends an appropriate message to interrogator 14, and automatically reverts to data reception mode.

In those applications where data transmission between transponders 11 occurs, such as from the device 18 at master workstation 16 to device 18a at workstation 16a shown in FIG. 2, transponder 11 will also transmit a destination address with the transmitted data. The data received at interrogator 14 will be stored in a data storage 40 during reception, then transmitted to the proper transponder 11 after the completion of data transmission from the sending transponder 11. Data storage and re-transmission may also occur simultaneously if transponder 11 and interrogator 14 are designed for simultaneous transmission and reception of data.

Although the present invention has been described in detail, it should be understood that various changes, substitutions, and alterations can be made hereto without departing from the spirit and the scope of the invention as defined by the appended claims.

What is claimed is:

1. A system for transmitting data, comprising:
   an interrogator for transmitting an interrogation signal;
   a plurality of data collectors for collecting data;
   a plurality of transponders each coupled to a corresponding data collector and each operable to receive the interrogation signal and to use the energy of the interrogation signal to transmit a response signal containing data from the data collector each of said transponders comprising:
      a reflector/antenna operable to alternately receive electromagnetic radiation in the interrogation signal and to selectively receive and reflect electromagnetic information in the response signal,
      a modulator connected to the reflector/antenna operable to switch the reflector/antenna from reflecting electromagnetic radiation to receiving electromagnetic radiation,
      a processor connected to the reflector/antenna and the modulator operable to control the operation of the modulator and further operable to receive data from the reflector/antenna and to cause data to be encoded in the response signal reflected by the reflector/antenna,
      a data storage connected to the processor, and wherein the processor is further operable to transmit data to the data storage and to receive data from the data storage, and
      a data interface connected to the processor, and wherein the processor is operable to transmit data to the data interface and to receive data from the data interface; and,
   wherein the interrogator is further operable to receive the response signal from the transponders.

2. The system of claim 1 wherein the interrogator is further operable to transmit operating instructions for the processor; and wherein the processor of each transponder is operable to receive the operating instructions.

3. The system of claim 1, wherein the interrogator further comprises:
   a first transmitter operable to transmit electromagnetic radiation;
   a second transmitter operable to transmit electromagnetic radiation at a frequency different from that of the first transmitter;
   a receiver operable to receive electromagnetic radiation;
   a processor connected to the transmitter and the receiver, the processor operable to receive data from the receiver and to transmit data to the transmitter for transmission;
   a data interface connected to the processor, and wherein the processor is operable to transmit data to the data interface and to receive data from the data interface; and
   a data storage connected to the processor, wherein the processor is operable to transmit data to the data storage and to receive data from the data storage.

4. The system of claim 1, wherein the transponder further comprises:

an energy storage connected to the reflector/antenna and the transmitter operable to store energy received from the antenna and further operable to transmit the stored energy to the transmitted.

5. The system of claim 1, wherein the interrogator further comprises:

a transmitter operable to transmit electromagnetic radiation;

a receiver operable to receive electromagnetic radiation;

a processor connected to the transmitter and the receive operable to receive data from the receiver and further operable to transmit data to the transmitter for transmission;

a data interface connected to the processor, wherein the processor is operable to transmit data to the data interface and to receive data from the data interface; and a data storage connected to the processor, wherein the processor is operable to transmit data to the data storage and to receive data from the data storage.

6. The system of claim 1, wherein the data collector is a calculation device.

7. The system of claim 1, wherein the data collector is a meter reading device.

8. A system for transmitting data, comprising:

an interrogator for transmitting an interrogation signal;

a plurality of data collectors for collecting data;

a plurality of transponders each coupled to a corresponding data collector and each operable to receive the interrogation signal and to use the energy of the interrogation signal to transmit a response signal containing data from the data collectors, each of said transponder comprising, an antenna operable to receive electromagnetic radiation, a reflector operable to alternately reflect and absorb electromagnetic radiation, a modulator connected to the reflector operable to switch the reflector from reflecting electromagnetic radiation to absorbing electromagnetic radiation, a first processor connected to the reflector, the antenna, and the modulator, the processor is operable to control the operation of the modulator to cause data to be encoded in the response signal reflected by the reflector and further operable to receive data from the antenna, a first data storage connected to the first processor, and wherein the first processor is operable to transmit data to the first data storage and to receive data from the first data storage, and a first data interface connected to the first processor, and wherein the first processor is operable to transmit data to the first data interface and to receive data from the first data interface; and, wherein the interrogator is further operable to receive the response signal from the transponders.

* * * * *